United States Patent
Teggatz et al.

(10) Patent No.: US 6,324,044 B1
(45) Date of Patent: Nov. 27, 2001

(54) DRIVER FOR CONTROLLER AREA NETWORK

(75) Inventors: Ross E. Teggatz, McKinney; Joseph A. Devore, Richardson; Timothy J. Legat, Allen; Timothy P. Pauletti, Plano; David J. Baldwin, Allen, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/305,571

(22) Filed: May 5, 1999

Related U.S. Application Data

(60) Provisional application No. 60/084,295, filed on May 5, 1998.

(51) Int. Cl.[7] ........................................... H02H 1/00
(52) U.S. Cl. ........................ 361/119; 327/379; 327/546
(58) Field of Search ............................... 361/111, 119, 361/93.7, 93.9, 58, 87, 86, 91.1, 91.2; 327/50–58, 321, 379, 545, 546

(56) References Cited

U.S. PATENT DOCUMENTS

| | | | |
|---|---|---|---|
| 5,050,190 | * | 9/1991 | Shimada et al. ............... 327/379 |
| 5,357,518 | * | 10/1994 | Peter ............................. 375/36 |
| 5,539,778 | * | 7/1996 | Kienzler et al. ............... 327/389 |
| 6,115,831 | * | 9/2000 | Hanf et al. .................... 714/43 |

* cited by examiner

*Primary Examiner*—Ronald W. Leja
(74) *Attorney, Agent, or Firm*—W. James Brady III; Frederick J. Telecky, Jr.

(57) ABSTRACT

A controlled area network (CAN) driver provides improved symmetry between its differential output signals CAN-H and CAN-L, and provides protection for its low voltage devices from voltage transients occurring on its output lines. A plurality of CAN drivers 80 are serially interconnected to form a driver system, wherein each downstream driver stage receives a time-delayed form of the digital input signal TxD, each stage providing a time-delayed contribution to the differential output signals of the overall driver system.

8 Claims, 3 Drawing Sheets

DRIVER FOR CONTROLLER AREA NETWORK

This application claims benefit of Provisional Appln. 60/084,295 filed May 5, 1998.

TECHNICAL FIELD OF THE INVENTION

The present invention relates generally to controller area network (CAN) systems and, more particularly, to a transceiver for use in a CAN employing low voltage components for high speed performance configured to handle high voltage transients.

BACKGROUND OF THE INVENTION

Controller area network (CAN) systems are currently being implemented as common networking systems for automotive and industrial applications. In a typical automotive application, the CAN provides a two (or one) wire link that can be routed around the entire vehicle. This link may illustratively be terminated by 120 ohm loads at each end. A CAN provides a lightweight and cost effective means for the vehicle's central processing unit to communicate with satellite peripheral modules, e.g., dome lamps, door modules, headlight modules, taillight modules, anti-skid braking system (ABS) modules, airbag modules, etc. The CAN wire itself is specified by the International Standards Organization (ISO) for at least a ten meter length. Unfortunately, this long wire acts as an ideal antenna that can be subject to automotive-type transients, as well as industrial-type transients, such as electromagnetic interference (EMI) and electrostatic discharge (ESD).

In order to operate in the harsh environments of automotive and industrial settings, a CAN transceiver must successfully withstand these high voltage transients and must be capable of handling the standard automotive requirements of double battery and 40 volt load dump. It must also withstand shorts from the CAN wire to $V_{cc}$, ground and $V_{bat}$, and any other power supply associated with the system. These requirements are typically specified as the ability to survive voltages on the CAN wire(s) between +40 and −6 volts.

A controller area network (CAN) transceiver in accordance with the prior art is shown in FIG. 1. It consists of a CAN-H driver and a CAN-L driver. CAN-H uses a pnp (or a PMOS) transistor as an active device, while CAN-L uses an npn (or an NMOS) transistor as an active device. In order to obtain high speed and symmetry, it is desirable to use low voltage, matched components. However, in this configuration, these low voltage components cannot withstand high voltage conditions due to gate oxide integrity issues and drain-to-source breakdown voltage limitations. High voltage components are not desirable for CAN applications due to their larger gate capacitances, and hence their slower operation. These high voltage components also incur a considerable silicon area penalty.

In a differential CAN driver of the types described in relation to the prior art and the present invention, there is a need to match the impedances of the two legs during switching and during the dominant state, and to match the timing of the two switching devices.

SUMMARY OF THE INVENTION

In accordance with the principles of the present invention, there is disclosed herein a controlled area network (CAN) driver which provides improved symmetry between its differential output signals and which provides protection for its low voltage devices from voltage transients occurring on its output lines.

Further in accordance with the present invention, a plurality of CAN drivers are serially interconnected to form a driver system, wherein each downstream driver stage receives a time-delayed form of the digital input signal, each stage providing a time-delayed contribution to the differential output signals of the overall driver system.

BRIEF DESCRIPTION OF THE DRAWING

The foregoing features of the present invention may be more fully understood from the following detailed description, read in conjunction with the accompanying drawings, wherein.

DESCRIPTION OF THE PREFERRED EMBODIMENTS

Figure 1:
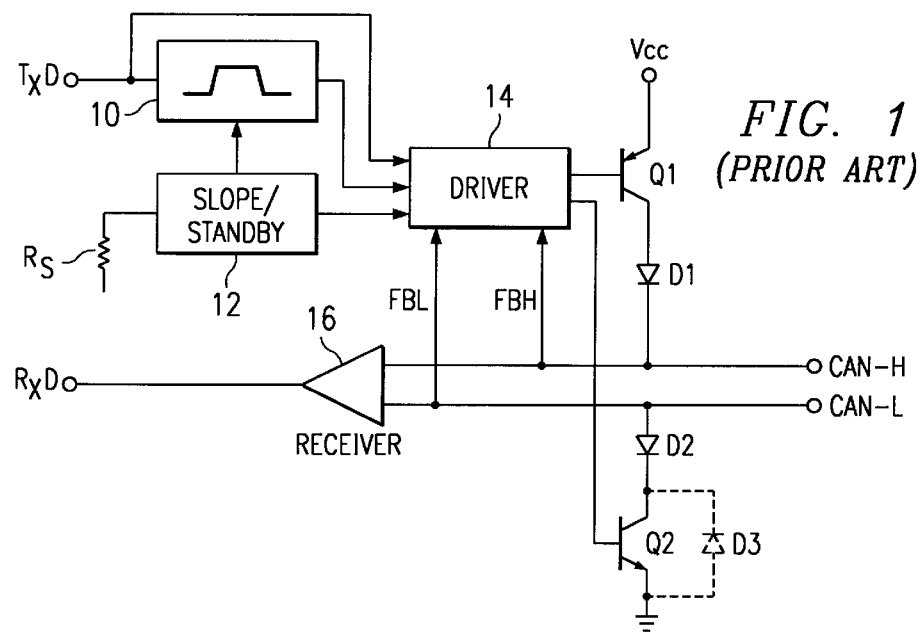
FIG. 1 is a partly-schematic block diagram of a controller area network (CAN) transceiver in accordance with the prior art.

A typical CAN transceiver in accordance with the prior art is shown in FIG. 1. A signal to be transmitted, TxD, is applied to wave shaping circuitry 10. An external selectable resistor, Rs, in conjunction with slope/standby circuit 12, controls the slope of the output signal from circuitry 10. Driver 14 provides differential output signals. The high-going signal from driver 14 is applied to the base of pnp transistor Q1. The signal on the emitter of Q1 is coupled through diode D1 to the high-going CAN wire, CAN-H. The low-going signal from driver 14 is applied to the base of npn transistor Q2. The signal on the emitter of Q2 is coupled through diode D2 to the low-going CAN wire, CAN-L. Feedback signals FB-H and FB-L, from CAN-H and CAN-L wires respectively, are coupled back to driver 14.

Receiver 16 is a differential comparator that senses the voltage across the CAN-H and CAN-L wires, providing a high-level output RxD when a threshold voltage is exceeded.

In the device of FIG. 1, diode D1 prevents parasitics from clamping the CAN-H wire at the voltage of the local Vcc. Diode D2 prohibits the parasitic diode D3 from clamping the CAN-L wire at the local ground potential. It is well known that pnp transistors cannot be matched to npn transistors. Therefore, transistors Q1 and Q2, being of different conduction types, have different strengths and dynamic characteristics, making it difficult to switch these in a symmetrical manner.

Figure 2:
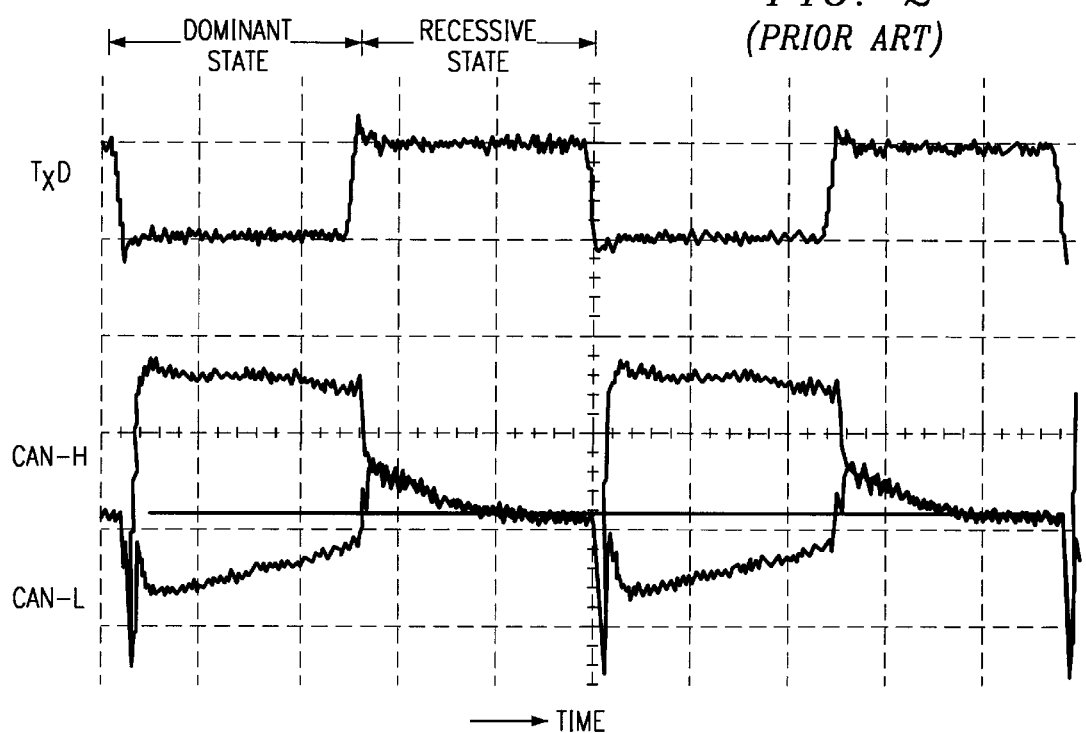
FIG. 2 illustrates a pair of waveforms demonstrating the performance of the driver of FIG. 1.

Referring to FIG. 2, there is shown a pair of waveforms demonstrating the performance of the driver of FIG. 1. It is easily seen that there is significant overshoot and a marked lack of symmetry between the CAN-H and CAN-L wires when the driver is switched from its recessive state to its dominant state, and a lack of symmetry and very long settling time when the driver is returned to its recessive state.

Figure 3:
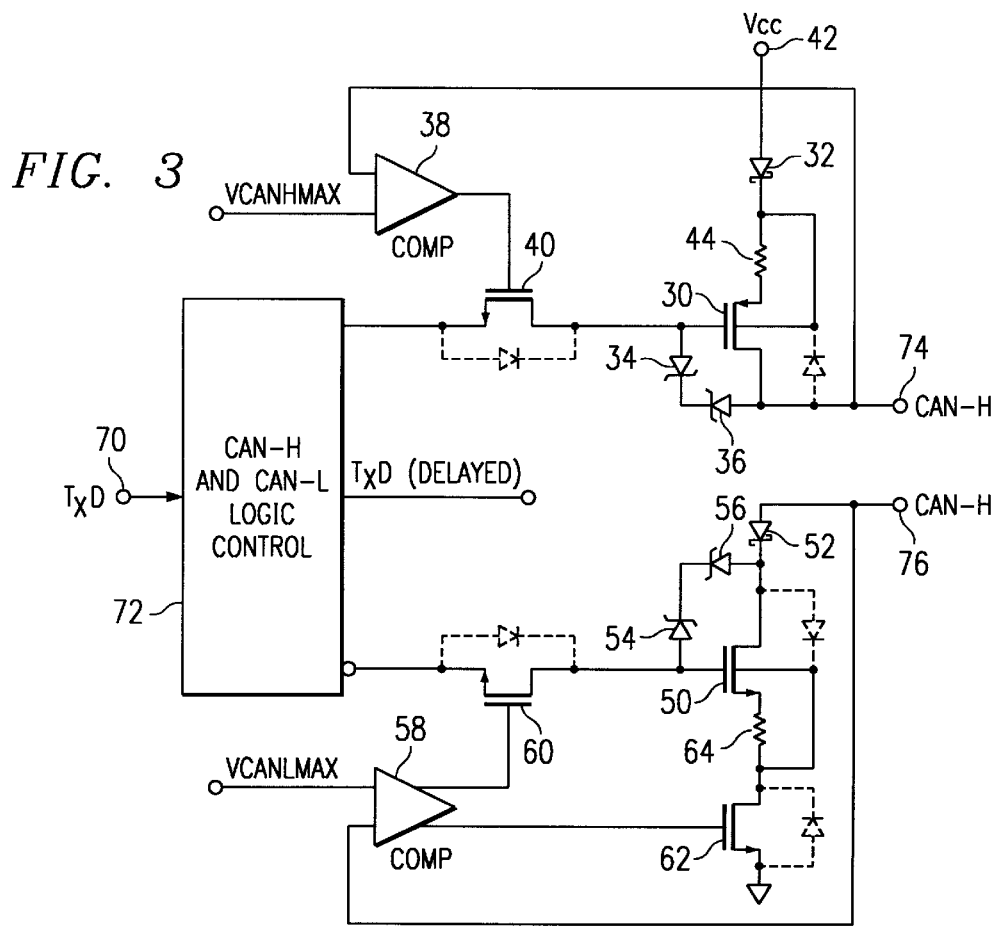
FIG. 3 illustrates a single-stage CAN driver in accordance with the present invention.

Referring to FIG. 3, there is shown a schematic diagram of a driver circuit and associated isolation circuitry for use in a controller area network (CAN) system in accordance with the present invention. In this embodiment, driver output signals CAN-H and CAN-L, coupled at terminals 74 and 76, respectively, are driven symmetrically in opposite directions in response to an input signal TxD, coupled to terminal 70.

The CAN-H driver circuitry includes PMOS field effect transistor (FET) 30, having its drain coupled to output terminal 74. Zener diodes 34 and 36 are coupled in a back-to-back configuration between the gate and drain of FET 30. The source of FET 30 is coupled through resistor 44 and schottkey diode 32 to voltage source terminal 42, to which a voltage source Vcc (not shown) may be coupled. The backgate contact of FET 30 is connected to the junction of resistor 44 and schottkey diode 32. A comparator 38, has a first input coupled to output terminal 74, a second input coupled to VCANHMAX, a threshold voltage representing the maximum value of CAN-H for which the CAN driver is permitted to operate, and its output coupled to the gate of NMOS FET 40 (shown with its parasitic source-to-drain diode). The drain of FET 40 is coupled to the gate of FET 30.

The CAN-L driver circuitry includes NMOS field effect transistor (FET) 50, having its drain coupled to output terminal 76 through schottkey diode 52. Zener diodes 54 and 56 are coupled in a back-to-back configuration between the gate and drain of FET 50. The source of FET 50 is coupled through resistor 64 to the drain of NMOS FET 62 (shown with its parasitic source-to-drain diode). The source of FET 62 is connected to ground. The backgate contact of FET 50 is connected to the junction of resistor 64 and the drain of FET 62. A comparator 58 has a first input coupled to output terminal 76, a second input coupled to VCANLMAX, a threshold voltage representing the maximum value of CAN-L for which the CAN driver is permitted to operate, and a first output coupled to the gate of FET 60 (shown with its parasitic source-to-drain diode), and a second output coupled to the gate of FET 62. The drain of FET 60 is coupled to the base of FET 50.

Terminal 70, to which input signal TxD is applied, is coupled to control logic 72, which provides symmetrical, oppositely-poled logic signals to the sources of FETs 40 and 60, the former receiving the non-inverted form and the latter receiving the inverted form. Control logic 72 additionally provides a time-delayed form of TxD, styled TxD-BELAYED, which is coupled as the TxD input to a subsequent stage of a multi-stage configuration to be discussed in a later paragraph in conjunction with FIGS. 4 and 5.

FET 62 is a very low impedance device that is normally in its conductance state. It is switched off only when device protection is needed, i.e., a over-voltage condition on CAN-L.

Resistors 44 and 64, in conjunction with schottkey diodes 32 and 52, dominate the impedance of the paths between the two CAN wires and the voltage references. In this way, the impedance contributions of transistors 30, 50 and 62 are minimized. The dominant effect of resistors 44 and 64 and diodes 32 and 52 enhance the capability of matching for symmetry between CAN-H and CAN-L.

The MOS input capacitances of transistors 30 and 50 can be made to match, providing the best timing match to the gates of these components.

The above-described circuit, including a CAN driver and its associated protection circuitry, effectively isolates low voltage devices from the effects of over-voltage transients on the CAN-H and CAN-L wires. When a high voltage, typically in excess of 9 volts, is sensed on the CAN-H line, comparator 38 disconnects the gate of CAN-H driver transistor 30 from the circuit via transistor 40, allowing the gate of transistor 30 to float to the CAN-H potential through zener diodes 34 and 36. This technique protects the sensitive gate oxide of the low voltage CAN-H driver transistor 30. The high voltage transient current to Vcc is blocked by the high voltage schottkey diode 32.

Similarly, when a high voltage, typically in excess of 9 volts, is sensed on the CAN-L line, comparator 58 disconnects the gate of CAN-L driver transistor 50 from the circuit via transistor 60 as well as disconnecting the source ground connection via transistor 62. Again, it is seen that the gate of transistor 50 is allowed to float to the CAN-L potential through zener diodes 54 and 56 to protect the sensitive gate oxide of the low voltage CAN-L driver transistor 50. Since CAN-L driver transistor 50 is effectively isolated and biased to Vcc through an integrated schottkey diode (not shown), the high voltage transient current to Vcc is effectively blocked thereby.

When a low voltage, which may be as low as −5 volts, is coupled onto the CAN-H wire, protection is provided by zener diode 36, which typically has a breakdown voltage of 6.5 volts. Similarly, protection from a low voltage, which may be as low as −5 volts, coupled onto the CAN-L wire, is provided by diode 52, which may have a reverse breakdown voltage of 40 volts.

Figure 4:
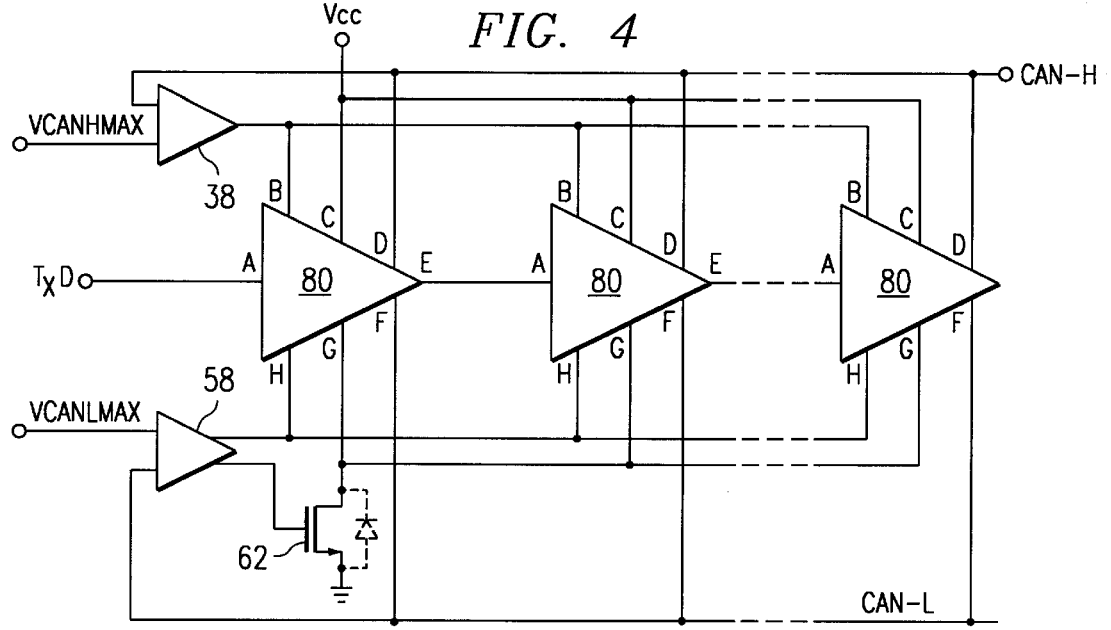
FIG. 4 illustrates a multi-stage CAN driver in accordance with the present invention.

A plurality of the circuits shown in FIG. 3 may be concatenated to enhance signal symmetry and shape the waveforms during switching. FIG. 4 illustrates a multi-stage CAN driver in accordance with the present invention. A plurality of CAN drivers 80 are serially interconnected to form a driver system, wherein each downstream driver stage receives a time-delayed form of the digital input signal, TxD, each stage providing a time-delayed contribution to the differential output signals, CAN-H and CAN-L, of the overall driver system. The multi-stage driver system comprises a serial connection of a number of individual CAN drivers 80, the number of such drivers being eight, by way of illustration. Each driver 80 may be identical to the driver of FIG. 3, excepting that comparators 38 and 58, and transistor 62 are common to the entire plurality. For an eight-stage system, resistors 44 and 64 may typically be 16 ohms.

Figure 5:
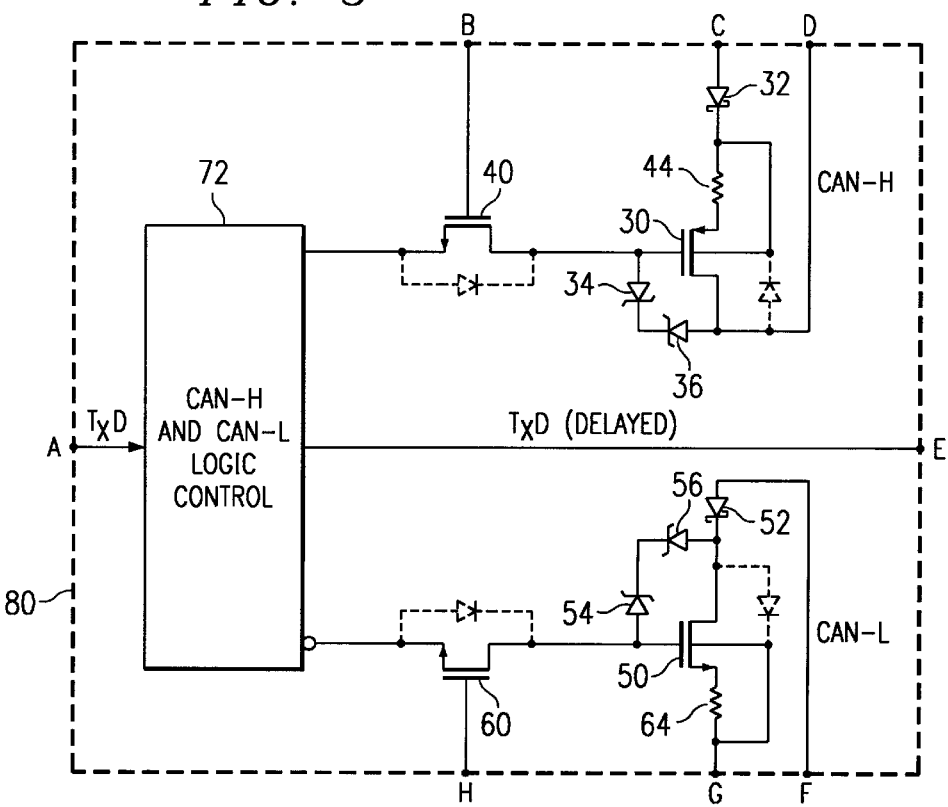
FIG. 5 illustrates in greater detail the driver stages of the CAN driver of FIG. 4.

FIG. 5 illustrates the components of each driver, and letter designators A through H in FIGS. 4 and 5 indicate the connections between the individual drivers 80 and the multi-stage driver in its entirety.

Figure 6:
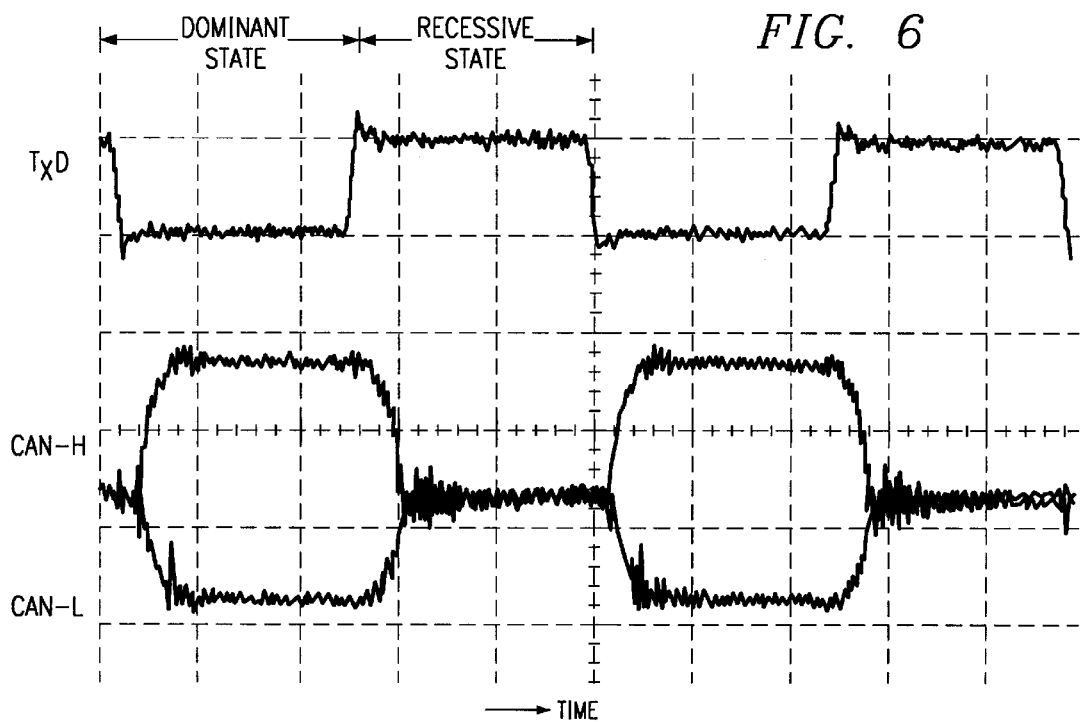
FIG. 6 illustrates a pair of waveforms demonstrating the performance of the driver of FIG. 4.

FIG. 6 illustrates a pair of waveforms for CAN-H and CAN-L demonstrating the performance of the multi-stage CAN driver of FIG. 4. It may be seen that the symmetry between the two signals and the wave shapes are significantly improved in comparison to the waveforms of the prior art driver of FIG. 1 shown in FIG. 2.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

What is claimed is:

1. A controller area network driver for supplying differential output signals to a two-wire link in response to an input signal, comprising:

a logic control circuit for generating first and second logic signals of opposite polarity in response to the input signal;

a first transistor having a gate, a drain coupled to a first output terminal, and a source coupled to a terminal for receiving a first voltage through a series-coupled first resistor and first diode, the first output terminal supplying a first one of the differential output signals to a first wire of the two-wire link;

a first comparator having a first input coupled to the first output terminal, a second input for receiving a first threshold signal, and an output;

a second transistor having a gate coupled to the output of the first comparator, a drain coupled to the gate of the first transistor, and a source coupled to receive the first logic signal from the logic control circuit, the first comparator producing an output signal to turn off the second transistor when the voltage on the first wire of the two-wire link exceeds a first voltage;

a third transistor having a gate, a drain coupled to a second output terminal through a second diode, and a source coupled to a terminal for receiving a second voltage through a series-coupled second resistor and source-drain path of a fourth transistor, the second output terminal supplying a second one of the differential output signals to a second wire of the two-wire link;

a second comparator having a first input coupled to the second output terminal, a second input for receiving a second threshold signal, a first output coupled to the gate of the fourth transistor, and a second output; and a fifth transistor having a gate coupled to the second output of the second comparator, a drain coupled to the gate of the third transistor, and a source coupled to receive the second logic signal from the logic control circuit, the second comparator producing a first output signal to turn off the fourth transistor and a second output signal to turn off the fifth transistor when the voltage on the second wire of the two-wire link exceeds a second voltage.

2. The controller area driver of claim 1 further comprising:

third and fourth diodes coupled in series back-to-back between the first output terminal and the gate of the first transistor.

3. The controller area driver of claim 2, wherein the third and fourth diodes are zener diodes.

4. The controller area driver of claim 1, wherein the first transistor has a backgate contact coupled between the first resistor and the first diode.

5. The controller area driver of claim 1 further comprising:

third and fourth diodes coupled in series back-to-back between the drain and the gate of the third transistor.

6. The controller area driver of claim 5, wherein said third and fourth diodes are zener diodes.

7. The controller area driver of claim 1, wherein the third transistor has a backgate contact coupled between the second resistor and the source-drain path of the fourth transistor.

8. The controller area driver of claim 1, wherein the first and second diodes are schottkey diodes.

* * * * *